United States Patent [19]

Flanders et al.

[11] Patent Number: 6,041,058

[45] Date of Patent: Mar. 21, 2000

[54] HARDWARE FILTERING METHOD AND APPARATUS

[75] Inventors: John A. Flanders, Ashland; David C. Ready, Westwood; Steven Van Seters, Stow; Leonard Schwartz, Bedford; William D. Townsend, Groton, all of Mass.

[73] Assignee: 3Com Corporation, Santa Clara, Calif.

[21] Appl. No.: 08/928,882

[22] Filed: Sep. 11, 1997

[51] Int. Cl.[7] .................................. H04J 3/02; H04J 3/24
[52] U.S. Cl. ............................................. 370/401; 370/428
[58] Field of Search .................................... 370/401, 402, 370/474, 476, 428, 389, 392, 398, 403, 404; 395/200.79; 364/229

[56] References Cited

U.S. PATENT DOCUMENTS

| | | | |
|---|---|---|---|
| 4,922,503 | 5/1990 | Leone | 370/402 |
| 5,088,090 | 2/1992 | Yacoby | 370/402 |
| 5,481,540 | 1/1996 | Huang . | |
| 5,500,860 | 3/1996 | Perlman et al. . | |
| 5,515,513 | 5/1996 | Metzger et al. | 370/401 |
| 5,568,613 | 10/1996 | Futral . | |
| 5,570,366 | 10/1996 | Baker et al. | 370/401 |
| 5,644,571 | 7/1997 | Seaman . | |
| 5,761,424 | 7/1998 | Adams et al. | 370/428 |

*Primary Examiner*—Douglas W. Olms
*Assistant Examiner*—Ken Vanderpuye
*Attorney, Agent, or Firm*—Weingarten, Schurgin, Gagnebin & Hayes LLP

[57] ABSTRACT

At least a portion of the data units in a bridge/router device are analyzed for purposes of filtering by employing high speed logic circuits. A data unit is analyzed by such logic circuits by examining the header portion of the data unit, employing information obtained from the header portion to designate possible output ports for transmission of the data unit, examining a predefined per-port filter enable indicator to determine whether filtering is to be applied to the data unit, and applying filtering for each respective port for which the per-port filter enable indicator indicates that filtering is to be applied. Filtering is also implemented with logic circuits and executed at high speed. Filtering may be executed based on MAC address group, port group, combination MAC address and port group, protocol type, and non-unicast traffic frequency. Data units that cannot be analyzed by the logic circuits are analyzed by software.

20 Claims, 7 Drawing Sheets

SAGM   0101
DAGM   0100   AND
       ────
       0100
150 ↗

FIG. 6

PORT GROUP TABLE 152

| PORT # | PGM |
|---|---|
| PORT # | PGM |
| PORT # | PGM |
| ⋮ | ⋮ |
| PORT # | PGM |

FIG. 7

PROTOCOL FILTER TABLE 154

| PORT # | PROTOCOL TYPE(S) |
| PORT # | PROTOCOL TYPE(S) |
| | |
| | . . . |
| PORT # | PROTOCOL TYPE(S) |

HARDWARE FILTERING METHOD AND APPARATUS

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention is generally related to telecommunications apparatus, and more particularly to efficient filtering techniques and apparatus for a telecommunications bridge/router.

Network devices which provide bridging and routing functions in telecommunications networks are known. Such devices facilitate the flow of data within the network by selectively retransmitting received data. One technique through which data is selectively retransmitted is known as filtering. Filtering is a process whereby data units are distinguished by attributes such as protocol type and group membership, and those data units which do not have a predefined set of attributes are discarded. Such filtering can be employed to improve network operation. However, the computations required to analyze data units for filtering are processor intensive. As a result, transmission of data units through network devices may be slowed when filtering operations are enabled and data flow within the network may be adversely affected.

BRIEF SUMMARY OF THE INVENTION

In accordance with the present invention, at least a portion of the data units received at a bridge/router are analyzed for filtering purposes by logic circuits within the bridge/router operating at speeds approaching the frame reception rate (wire speed). A data unit is analyzed by examining the data unit header, employing information obtained from the header to designate possible output ports for transmission of the data unit, examining a predefined per-port filter enable indicator to determine whether filtering is to be applied to the data unit, and applying filtering for each respective port for which the per-port filter enable indicator indicates that filtering is to be applied. Filtering can be simultaneously applied in the logic circuits based upon protocol type, port group, MAC Address group, cast type, and combinations thereof.

Hardware analysis and filtering by logic circuits operating at wire speed improves network performance. Software based analysis and filtering techniques are often capable of handling a wide variety of data units types. However, such software based techniques are cumbersome and processor intensive. The present invention employs high speed logic circuits to analyze and filter a subset of data unit types, typically the data unit types most commonly handled by the bridge/router, and employs flexible software based techniques for those data units that cannot be handled by the logic circuits. Hence, the flexibility of the software based techniques is retained while reducing analysis and filtering time for at least a portion of data unit traffic. Further, multiple filters can be simultaneously applied for those data units that are handled by the logic circuits.

BRIEF DESCRIPTION OF THE DRAWING

The invention will be more fully understood in the following Detailed Description of the Invention, in conjunction with the Drawing, of which.

DETAILED DESCRIPTION OF THE INVENTION

Figure 1:
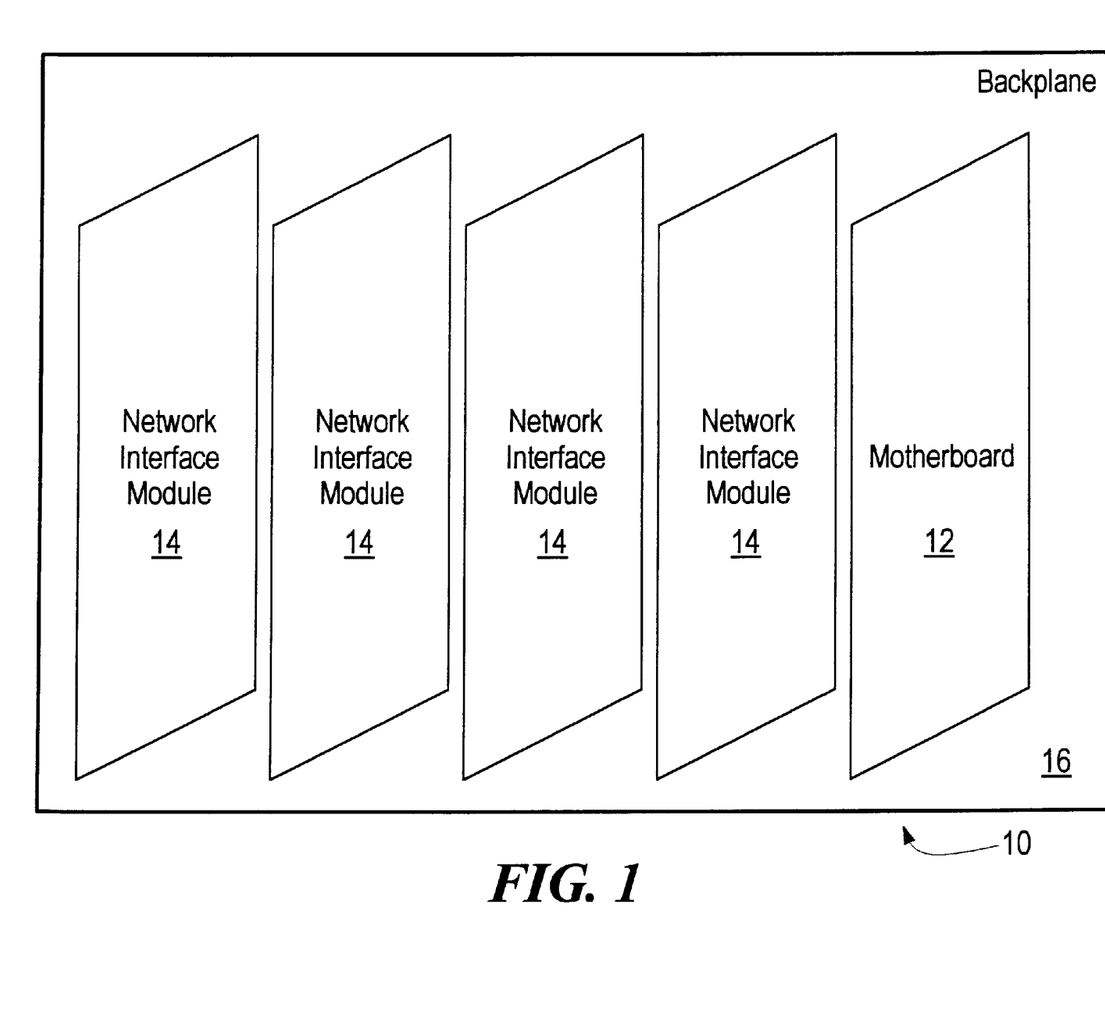
FIG. 1 is a simplified block diagram of a bridge/router device for use in telecommunications network.
Figure 2:
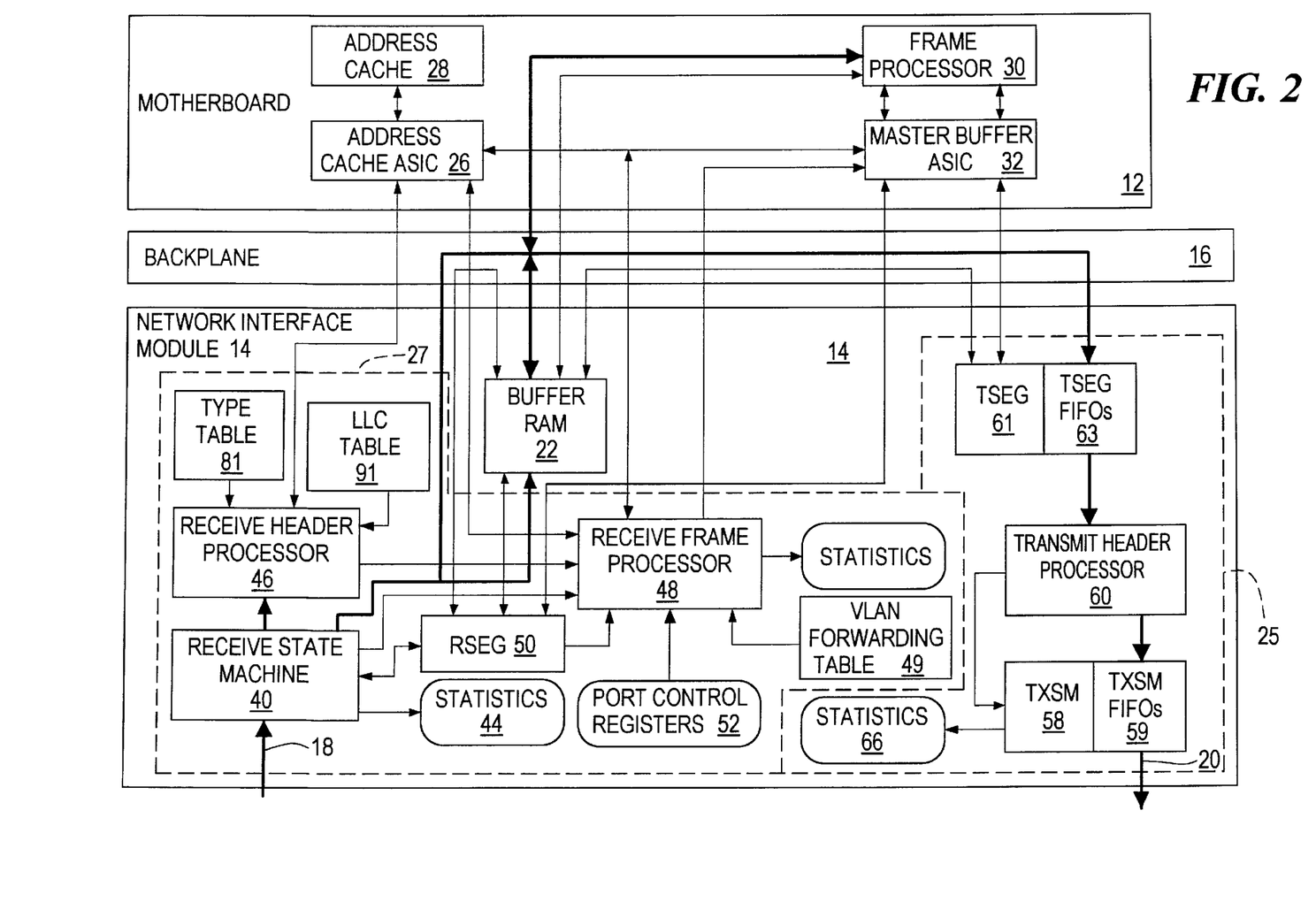
FIG. 2 is a detailed block diagram illustrating the motherboard and network interface module of FIG. 1.

Referring to FIGS. 1 and 2, a bridge/router for use in a telecommunications network includes a motherboard 12 and at least one network interface module 14 which are interconnected through a backplane 16. Separate interface modules support Ethernet, Fiber Distributed Data Interface ("FDDI") and Asynchronous Transfer Mode ("ATM") traffic. In one embodiment each 10/100Mb Ethernet interface module has six ports, each gigabit Ethernet interface module has one port, each FDDI interface module has six ports and each ATM interface module has two OC3 ports or one OC12 port. The ports provide connections to other devices in the network, through which data units can be received and transmitted. Incoming data units may be bridged, routed, translationally bridged and filtered by the bridge/router. Logic circuits in the motherboard and interface modules are responsible for data unit reception and transmission, parsing Data Link and Network Layer headers, looking up source and destination Media Access Control ("MAC") and Network Layer addresses and making forwarding decisions.

The motherboard 12 includes an Address Cache ASIC ("ACA") 26 with associated address cache memory 28, a Frame Processor ("FP") 30 and a Master Buffer ASIC ("MBA") 32. The Address Cache ASIC 26 is responsible for performing cache 28 lookups on Destination Addresses ("DAs") and Source Addresses ("SAs"). The Address Cache ASIC is employed to obtain MAC addresses for bridging support and Network Layer addresses for routing support. The Master Buffer ASIC 32 is responsible for data buffer management in buffer RAM 22.

Each network interface module includes buffer RAM 22, a Transmit ASIC ("TA") 25 and a Receive ASIC ("RA") 27. The Transmit ASIC and Receive ASIC are specific to the type of data traffic which the network interface device is designed to support (such as Ethernet, ATM and FDDI). The Receive ASIC 27 functions to perform a preliminary analysis on incoming data units. The Transmit ASIC 25 functions to transmit data units.

The Receive ASIC 27 includes a Receive State Machine ("RXSM") 40, a Receive Header Processor ("RHP") 46 and a Receive Frame Processor ("RFP") 48. The Receive State Machine is responsible for receiving data units through one or more ports from an associated communications link. After receiving a data unit, the Receive State Machine 40 generates data unit status information. The status information, which contains error information and byte and frame count data on a per port basis, is stored in registers 44. The Receive Header Processor 46 is responsible for identifying data units to be bridged or routed, determining inbound data unit encapsulation type, and performing protocol specific processing for routed data units. The Receive Header Processor also determines which VLAN, if any, each incoming frames is received on. There are different versions of Receive Header Processors 46 for different network interface types, e.g., Ethernet, FDDI and ATM. The Receive Header Processor 46 is primarily implemented in microcode. A Receive Segmentation DMA controller ("RSEG") 50 controls storage of received data units within appropriate buffer RAM 22 locations and forwards status information to the Receive Frame Processor 48. Information in a VLAN forwarding table 49 is employed by the Receive Frame Processor 48 to verify if the data unit is allowed to be forwarded through the outbound interface. In particular, the Receive Frame Processor 48 is responsible for making forwarding decisions based on information supplied by the Receive Header Processor 46, Address Cache ASIC 26, Receive State Machine 40, the RSEG 50, the per Port Control Registers 52, and VLAN configuration information contained in configuration tables associated with the Receive Frame Processor 48. The Receive Frame Processor 48 also generates Transmit Vectors for data units being processed in hardware over a fast processing path and Receive Vectors for data units being passed to the Frame Processor 30 software for further processing over a slower path. The Receive Frame Processor 48 is implemented partially in microcode.

The Transmit ASIC 25 includes a Transmit State Machine ("TXSM") 58, a plurality of Transmit State Machine FIFOs 59, and a Transmit Header Processor ("THP") 60. A Transmit Segmentation Controller ("TSEG") 61 serves to move data unit segments from locations within the Buffer RAM 22 into an input FIFO designated as the TSEG FIFO 63, which comprises an input FIFO to the Transmit Header Processor 60. The Transmit Header Processor 60 performs any necessary header translations and, upon completion of such translations, moves the translated header to the Transmit State Machine FIFO 59. The Transmit Header Processor 60 also inserts VLAN tags into frames as necessary. Data units are forwarded from the Transmit State Machine FIFO 59 over the respective output port 20 of the network interface module 14. The Transmit State Machine 58 is responsible for controlling transmission of data units from the respective output port 20. Following transmission, the Transmit State Machine 58 generates data unit transmit status information which is stored in registers 66. The status information includes error information and transmit byte and frame count information on a per port basis. Different versions of the Transmit State Machine 58 are provided for different network interface module types, e.g., Ethernet, FDDI and ATM.

Figure 3:
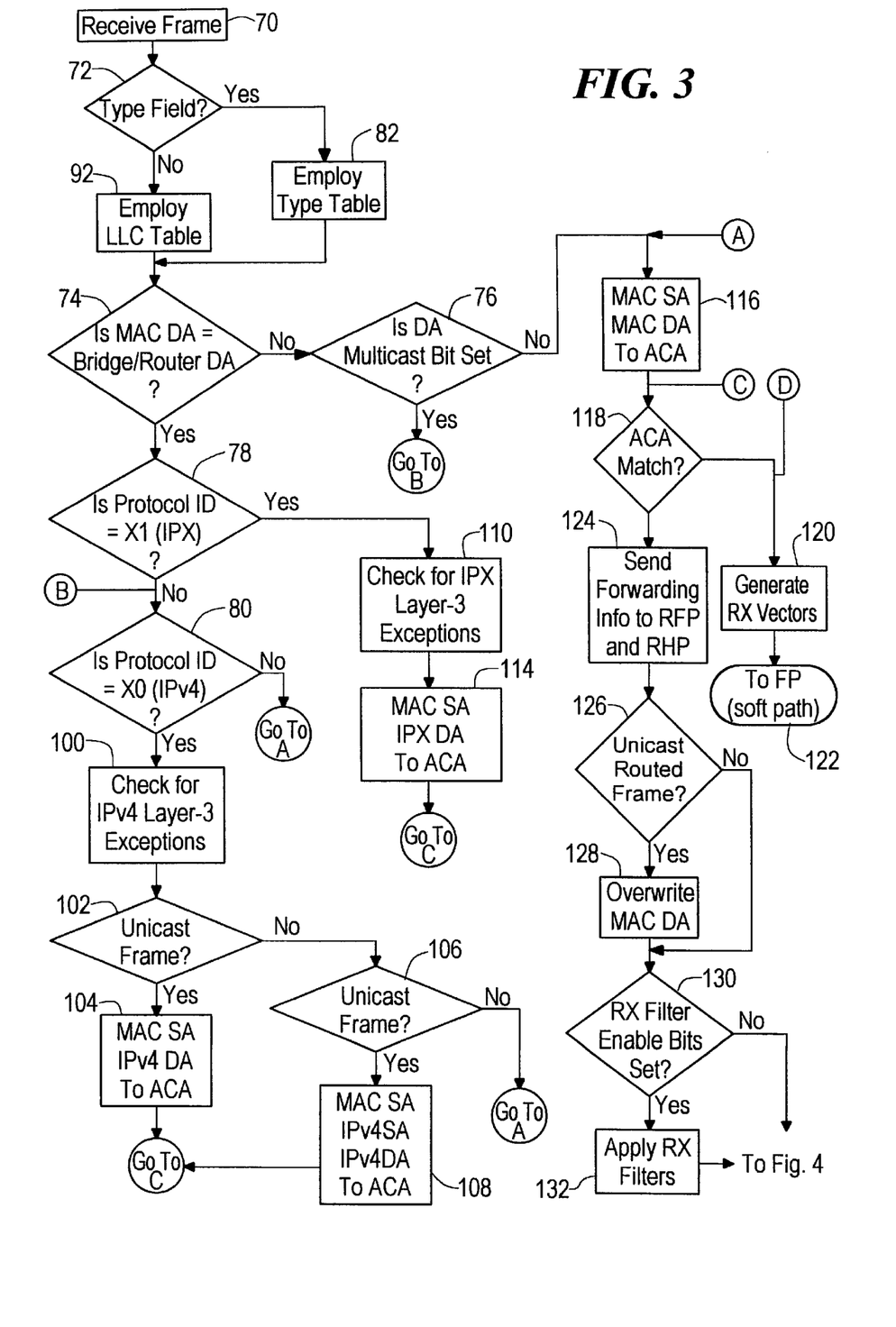
FIGS. 3 and 4 are flow diagrams that illustrate data unit processing by the bridge/router.
Figure 4:
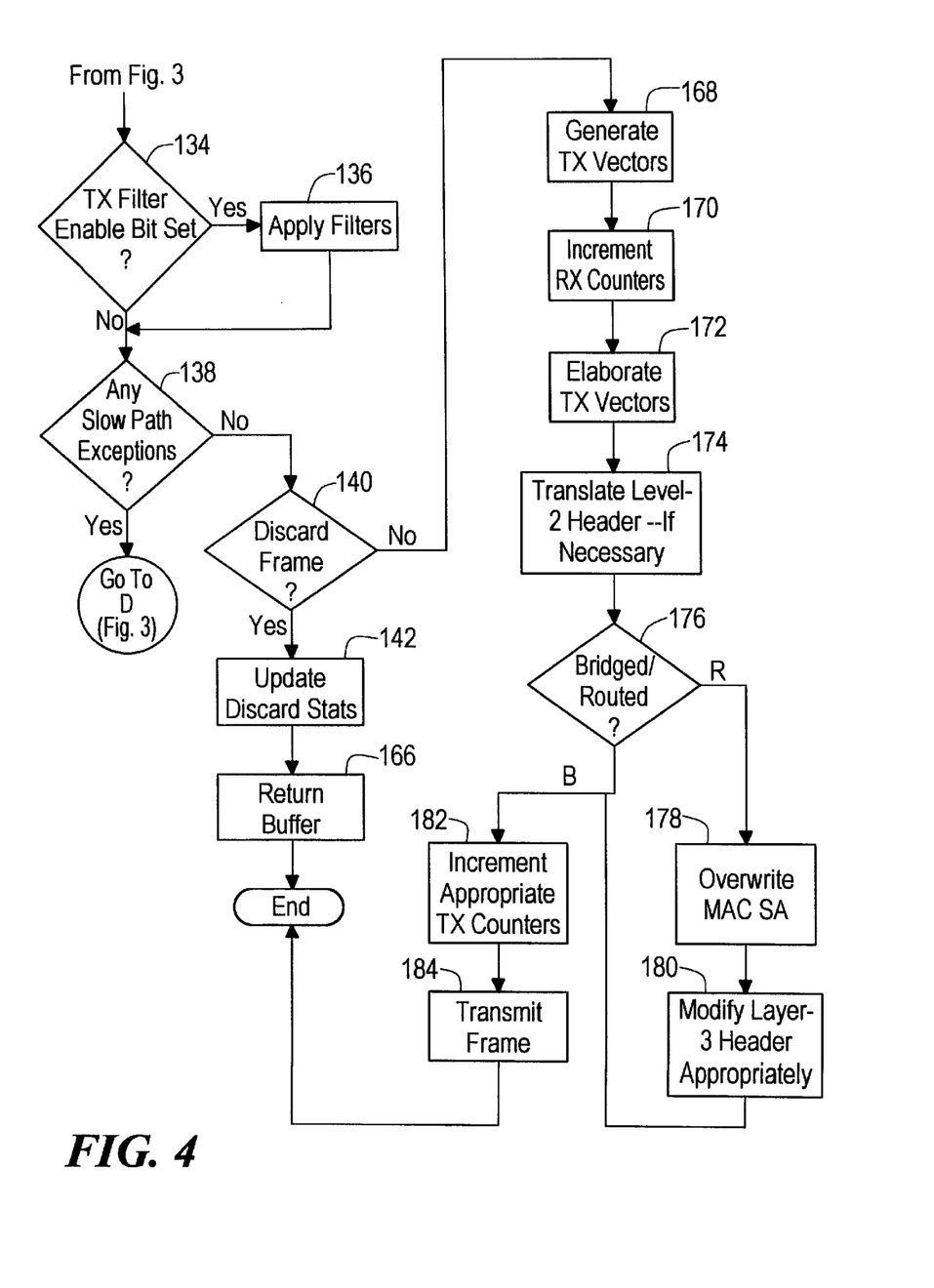

FIGS. 3 and 4 illustrate hardware based processing in logic circuits in a network interface module 14 configured for Ethernet traffic. When an Ethernet frame header is received in the 10 bridge/router at the Receive Header Processor 46 as shown in step 70, the layer 2 header of the frame is examined as shown in steps 72, 74, 76, 78 and 80. Given a header with the format: Destination Address ("DA")/Source Address ("SA")/Type (e.g., IPv4, Appletalk etc.)/Layer 3 header, the Receive Header Processor will first examine the location of the Type/Length field as shown is step 72. In particular, the value of the field following the SA field is compared with the predetermined value (1500) above which the field is determined to be a Type field. If the field is determined to be a Type field, then the Type Table 82 is employed to determine if the Type is one of fifteen predefined values which correspond to a specific Type such as IPv4.

Figure 5:
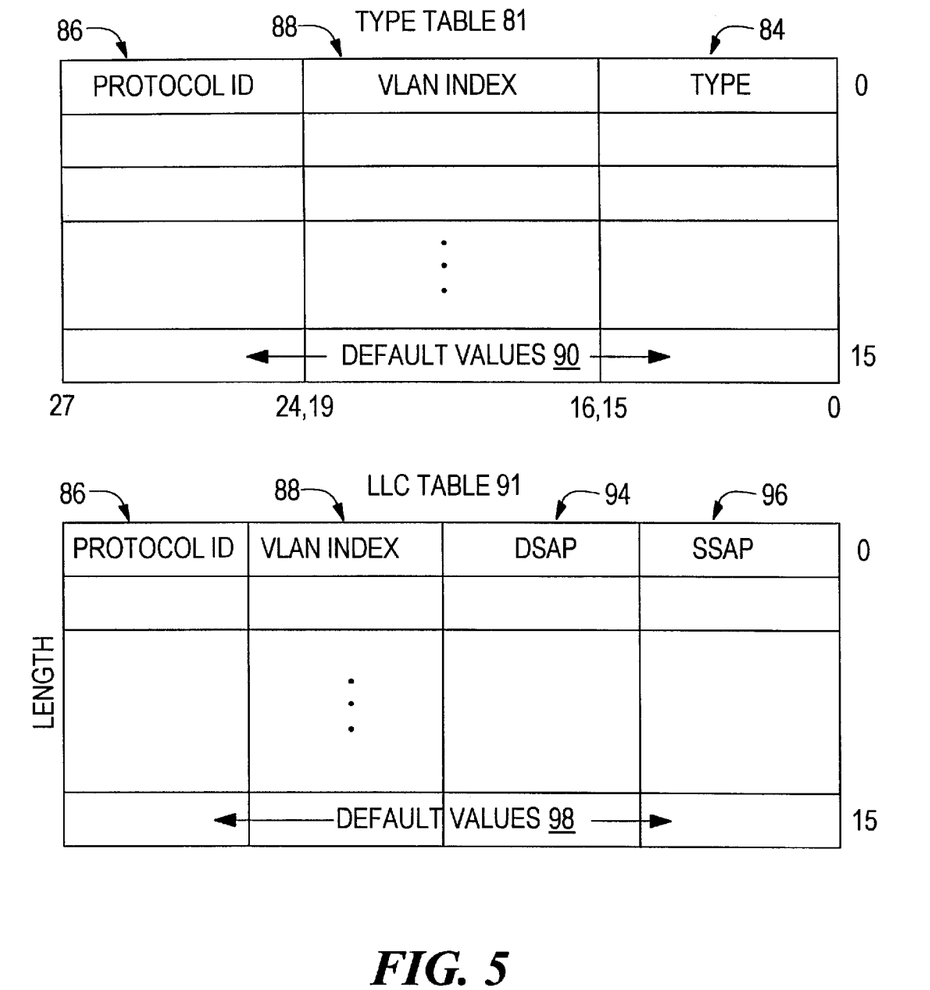
FIG. 5 illustrates LLC and Type tables employed in the network interface module of FIG. 2.

Referring to FIGS. 3–5, if the 16 bit Type field received in the frame matches one of the 16 bit Type values 84 programmed into the first fifteen entries of the Type Table 81 then a Protocol ID 86 and a Protocol VLAN index 89 are obtained from the first row in which there is a match. If such a match is not obtained then a default Protocol ID 86 and VLAN index 88 are retrieved from the sixteenth row 90 of the Type Table 81.

If the field was determined not to be a Type field in step 72, 30 but rather a Length field such as in the format: DA/SA/Length/Logical Link Control ("LLC"), an LLC table 91 is employed by the Receive Header Processor 46 to perform a lookup operation as shown in step 92 to obtain a Protocol ID 86 and a Protocol VLAN index 88. More specifically, each row in the LLC table includes a Protocol ID field 86, a Protocol VLAN index field 88, a Destination Service Access Point ("DSAP") 94 field and a Source Service Access Point ("SSAP") 96 field. If the 16 bit DSAP/SSAP field received in the frame matches one of the 16 bit DSAP/SSAP values, 94 and 96, programmed into the first fifteen entries of the LLC Table 91 then a Protocol ID 86 and a Protocol VLAN index 88 are obtained from the first row in which there is a match. If such a match is not obtained then a default Protocol ID 86 and VLAN index 88 is retrieved from the sixteenth row 96 of the LLC Table 91.

In step 74 the Receive Header Processor 46 will determine if the Received DA is equal to one of a plurality of MAC addresses which have been assigned to the Bridge/Router. More specifically, if the upper three bytes of the received DA, the Organization Unique Identifier ("OUI"), matches the programmed OUI of the Bridge/Router, then the lower three bytes of the received DA are examined to determine whether the value indicated by the lower three bytes of the received DA falls within a predefined range. The upper and lower bounds of the predefined range are maintained in first and second respective registers. If the lower three bytes of the DA do not fall within the range, the RHP will then determine if the DA multicast bit is set as shown in step 76. If the received DA multicast bit is not set the frame will be processed as a bridge only frame and the RHP 46 will send the SA and DA obtained from the received frame to the Address Cache ASIC 26 as shown is step 116.

If, in step 74, the received OUI is equal to the predefined OUI and the lower three bytes of the received DA fall within the predefined range, the RHP will then determine if the received frame is one of two types of datagrams, IPv4 or IPX, which can be routed in its entirety by the hardware as shown in steps 78 and 80. An Ipv4 or IPX datagram is identified by use of either the Type Table 81 or LLC Table 91. If the received frame is neither an Ipv4 or IPX datagram the frame will be processed as a bridge only frame and the RHP 46 will send the SA and DA obtained from the received frame to the Address Cache ASIC 26 as shown is step 116.

If, in step 78, the Protocol ID obtained from the Type Table 81 or LLC Table 91 indicates that the received frame is an IPX datagram then the Layer 3 IPX header portion of the frame is examined as shown in step 110. In particular, the IPX header is examined through a series of checks to determine whether the header contains an invalid length value, a packet type value indicating a NETBIOS packet type, a destination socket value of all ones, a transport control value which is greater than fifteen, a source network number of zero, a source node number of all ones and that the IPX routing enable bit is not set in the receive Port Control Register ("PCR") for the respective port. If any one of the checks is found to be true an exception bit is set, a receive vector will get generated, shown is step 120, by the receive Frame Processor 48 and the frame is forwarded to the Frame Processor 30 which is shown is step 122. For the IPX Unicast Routed frame case the RHP 46 will send the SA, and the IPX destination network and host number to the ACA 26 as shown is step 114.

If, in step 80, the Protocol ID obtained from the Type Table 81 or LLC Table 91 indicates that the received frame is an IP datagram then the Layer 3 IP header portion of the frame is examined as shown in step 100. In particular the IP header is examined through a series of checks to determine whether the header contains a proper version number, has the proper length, passes a check sum verification, indicates a Time To Live ("TTL") hop count greater than one, and that the IP routing enable bit is set in the receive Port Control Register ("PCR") for the respective port. The processing logic is specifically configured for frames of a particular version and length range. When the exception bit is set for frames which do not have the specified attributes the RFP will generate a receive vector and forwarded the frame to the Frame Processor 30 as shown is steps 138, 120 and 122. A checksum discrepancy indicates possible data corruption. The TTL hop count is employed to limit traffic caused by misdirected frames by limiting the number of devices through which the frame can be routed. Hence, if any of the checks results in a failure, an exception bit is set and the frame is forwarded to the Frame Processor for processing by software.

If none of the checks performed in step 100 results in a failure, then the frame header is examined to determine whether the frame is a unicast frame as shown in step 102. In particular, a predefined multicast bit in the frame header is examined. If the multicast bit is not set then the frame is a unicast frame. If the frame is a unicast frame the RHP 46 will send the SA and the IPv4 Destination Address to the ACA 26 as shown is step 104. The SA and the Ipv4 DA are forwarded to the ACA which will compare both the SA and Ipv4 DA against stored addresses in the cache. If a match with both addresses are made the ACA will return a new MAC DA and a transmit port number to both the RHP 46 and the RFP 48. The Receive Header Processor 46 then overwrites the MAC Da field in the header portion of the frame with the MAC Da retrieved from the ACA 26 as shown in step 128. The original MAC DA may be saved prior to such overwriting operation so that the original frame can be reconstructed to Support remote monitoring ("RMON") probing, including external RMON probing. If a match is not made on both addresses a slow path exception case will be detected by the RFP 48 and the RFP will generate a receive vector and forwarded the frame to the Frame Processor 30 and shown is steps 138, 120 and 122.

If the multicast bit is set as determined in step 106 then the MAC DA is examined to determine whether the frame is designated for Ipv4 Multicast routing or as an Ipv4 broadcast bridged frame for transmission. In the case of an Ipv4 Multicast routed frame the RHP 46 sends the MAC SA and the Ipv4 Source and Destination Addresses to the ACA 26 as shown in step 108. The addresses transmitted from the RHP 46 to the ACA 26 are then employed by the ACA 26 to perform two lookups in the Address Cache 28. If a match is made on both addresses the ACA will transmit a 24 bit Parent Port Mask and a 24 bit Forward Mask to the Receive Frame Processor. The multicast frame may be bridged through a first set of ports and routed through a second set of ports. Both port sets are mutually exclusive. The Parent Port Mask indicates valid ports for receiving the frame and also indicates which ports are used to employ bridging.

A Bridge Forward Mask for a bridged version of the frame is generated by performing a logical AND operation on the Parent Mask and the Forward Mask. A Route Forward Mask for the routed version of the frame is generated by performing a logical AND operation on the (inverse of the Parent Mask) and the Forward Mask. The receive port is removed from the bridge mask since there is no reason to bridge the frame out of the receive port. Further, the frame is discarded if the frame is found to have entered the device through a port other than a Parent Port.

If in step 106 the received DA is the MAC broadcast address the frame will be processed as a bridge only frame and the RHP 46 will send the SA and DA obtained from the received frame to the Address Cache ASIC 26 as shown in step 116.

In step 130 the receive filter enable bits associated with the receive port are examined. The receive filter enable bits are maintained in the Port Control Register associated with the receive port. If the receive filter enable bits are set for the receive port then the appropriate filters are applied on the receive side as shown in step 132. The transmit port filter enable bits are then examined as shown in step 134. The transmit filter enable bits are maintained in the Port Control Register associated with the transmit port. If the transmit port filter enable bits are set for the respective indicated transmit port then the appropriate filter or filters are applied for that respective transmit port as shown in step 136, Hence, filtering can be selectively applied at the receive port and/or any combination of transmit ports.

In step 138, if the Receive Frame Processor determines that there is some slow path exception case which needs to be handled by the software, the RFP will generate a receive vector and send the frame to the Frame Processor. If the RFP determines that there is no slow path exception case it will then determine if the frame is to be discarded as shown in step 140. If the frame is to be discarded by the RFP the RFP will update the appropriate discard statistic counters and return the buffer as shown in steps 142 and 166.

If in step 140 the RFP determines that the frame is not going to be discarded then at least one transmit vector is generated as shown in step 168. In particular, in the case of a unicast frame the Receive Frame Processor 48 generates a transmit vector and sends such vector to the Master Buffer ASIC 32. The transmit vector includes a Route flag, a frame protocol ID, a physical port forward mask and a transmit queue indicator. In the case of an IPv4 multicast frame the RFP 48 transmits two transmit vectors to the Master Buffer ASIC 32. One transmit vector indicates the ports through which the frame is to be routed and the other transmit vector indicates the ports through which the frame is to be bridged. A transmit vector route bit within the vector is employed to differentiate the two transmit vectors. Receive counters associated with the RFP 48 are then incremented as shown in step 170. In particular, for the unicast Ipv4 route case the RFP 48 increments an Ipv4 Receive Unicast Route Frame Counter and an IPv4 Receive Unicast Route Byte Counter. In the IPv4 Multicast Route case the RFP 48 increments and IPv4 Receive Multicast Route Frame Counter and IPv4 Receive Multicast Route Byte Counter. The Master Buffer ASIC 32 then operates on the transmit vector or vectors to specify transmit queues as shown in step 172 and forwards the vector to the Transmit Header Processor 60, the Transmit Header Processor 60 then translates the layer-2 header, if necessary, as shown in step 174. In particular, if the frame is to be transmitted on a different media than that from which it was received, such as from Ethernet to FDDI, then the layer-2 header is translated to accommodate the new layer-2 protocol.

If the frame is designated to be bridged as determined in step 176, the appropriate set of bridge transmit counters 66 will be incremented by the Transmit State Machine 58 as shown in step 182 prior to transmitting the frame as shown in step 184. If the frame is designated to be routed as determined in step 176 then the Transmit Header Processor 60 overwrites the MAC SA with the new MAC SA of the Transmit Port as shown in step 178. The THP 60 will also perform the necessary layer-3 modifications. In the IPX route case the THP will increment the Transport Control field. In the Ipv4 route case the THP will decrement the TTL field and update the checksum field. Once the necessary layer-3 modifications have been made as shown in step 180, the appropriate set of route transmit counters 66 will be incremented by the Transmit State Machine 58 as shown in step 182 prior to transmitting the frame as shown in step 184.

Figure 6:
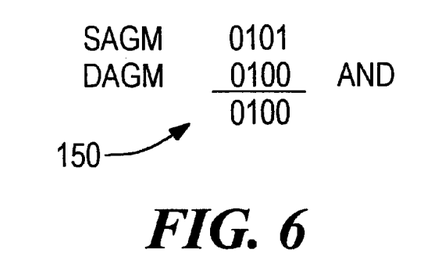
FIG. 6 illustrates MAC address group filtering employed in the network interface module of FIG. 2.

To apply the MAC Address Group filter a logical AND operation is performed on the SAGM and the DAGM to provide a result mask 150 which will indicate if the two addresses belong to one or more of the same groups. If the result is not zero the frame will not be discarded due to the MAC Address Group filter. If the result is zero the frame may be discarded due to the MAC Address Group filter if the appropriate filter enable bits are active. The transmit vector is then generated and sent to the Master Buffer ASIC 32 indicating a target port and queue. The Port Control Register is also examined for the indicated transmit port to determine if the transmit filter enable bit is set. If the transmit filter enable bit is set then the filter is applied on the transmit side by performing a logical AND operation on the SAGM and DAGM. If the transmit filter enable bit is not set then the filter is not applied on the transmit side. Hence, filtering may be applied on the receive side and/or the transmit side.

Filtering can also be executed based on Port Group Associations. Port Groups are configurable communities of interest based upon network ports within the bridge/router. Port Group filter logic ensures that traffic between individual network ports will only be forwarded if both source and destination ports share at least one common Port Group designation. Port Groups provide a more general scope filtering mechanism than MAC address groups since individual end-stations attached to ports inherit Port Group assignments. In one embodiment, Port Groups do not span network devices, i.e., the definition of Port Groups does not have network wide scope.

Figure 7:
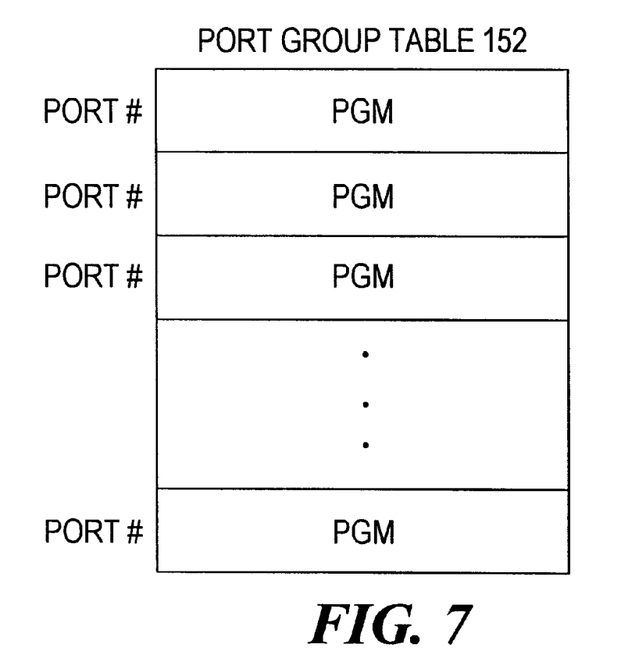
FIG. 7 illustrates the port group filter table employed in the network interface module of FIG. 2.

Referring to FIG. 7, in one embodiment the bridge/router supports a maximum of thirty-two Port Groups. These Port Group associations are maintained in a Port Group Table 152 and can be defined to suit installation requirements. Individual port groups are represented by a 32-bit Port Group Mask ("PGM") field. The Port Group Table includes 24 entries of PGM, one PGM per port in the present implementation, i.e., each PGM entry corresponds to one of the ports. To apply the filter for each frame, the bridge/router logically ANDs the PGM of both the receive and transmit ports, designated "SPGM" and "DPGM," respectively. If the result is non-zero, the frame is allowed to be forwarded; otherwise the frame is discarded. Port group assignments are enforced for all MAC unicast, multicast, and broadcast bridged and routed frames. The MAC addresses of the bridge/router, however, are not affected by port groups. The Port Group Filter may also be implemented separately on the receive and/or transmit paths of any port.

The Port Group Filter is implemented in high speed logic circuits for frames that are processed without assistance from the FP 30, and in the software for exception (softpath) frames. There are two configurable parameters for every port in the bridge/router which activate the Port Group Filter support for that respective port. These parameters, which are in the Port Control Registers, are the Port Group Receive Enable bit and the Port Group Transmit Enable bit. Network Interface Module 14 logic circuits perform port group enforcement when either the Port Group Receive Enable bit in the Port Control Register 52 of the receive port or the Port Group Transmit Enable bit in the Port Control Register 52 of the transmit port are set. If the port group filter is enabled on either the receive port or the transmit port, and the frame otherwise is to be forwarded by the logic circuits, then the logic circuits apply the filter as described above. If the frame is to be delivered to the Frame Processor 30 for software processing (because of an exception condition such as unknown address), then software is responsible for applying the port group filter.

Combination Filters may also be employed. Combining the MAC Address Groups with the Port Groups provides a method for instituting protocol-independent VLANs. Combination Filter logic operates to link source and destination MAC Address Group associations with destination Port Group associations, and only allows traffic flow if commonality exists. A Combination Group is a logical association of network stations and network ports established by a network administrator. End-stations can communicate with each other only if they share at least one Group in common and the destination port is configured to support that Group.

Combination Groups are represented by both an Address Group Mask ("AGM") and a Port Group Mask ("PGM"). To execute the combination filter the bridge/router logically ANDs the MAC AGMs of both the source and destination addresses, designated "SAGM" and "DAGM" respectively, and the PGM of the destination port, designated "DPGM." If the result is non-zero, the frame is allowed to be forwarded. Otherwise the frame is discarded. Combination Group Filters may be implemented separately on the receive and/or transmit paths of a port.

A Combination Group Receive Enable bit and Combination Group Transmit Enable bit maintained in a Port Control Register 52 for each port control activation of the Combination group filter. Combination Group enforcement is executed when either the Combination Group Receive Enable bit in the Port Control Register of the receive port or the Combination Group Transmit Enable bit in the Port Control Register of the transmit port are set. If the combination group filter is enabled on either the receive port or the destination transmit port, and the frame otherwise is to be forwarded by the hardware then the hardware applies the filter as described above. If the frame is to be delivered to the software for forwarding (because of an exception condition such as an unknown address), then the software is responsible for applying the combination group filter.

Figure 8:
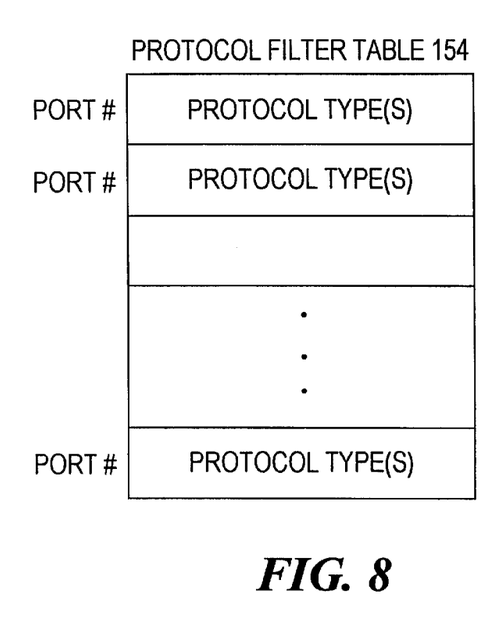
FIG. 8 illustrates the protocol filter table employed in the network interface module of FIG. 2.

Referring to FIG. 8, a Protocol Type Filter provides a means for suppressing specific Protocol Type traffic either from a source port or to a destination port, where Protocol Type refers to the EtherType field for either Ethernet II or 802/3 SNAP encapsulated frames or the LLC DSAP/SSAP field for 802.3 non-SNAP frames. Specific Protocol Type values may be prevented from leaving or being forwarded to a particular network segment. The bridge/router hardware interrogates the appropriate field of all frames on the configured ports, and frames that meet the filter criteria are discarded. Protocol filters are implemented via a Protocol Filter Table 154 in the Receive Frame Processor 48. The Protocol Filter Table 154 contains a configurable list of Protocol Types Per Port that the hardware can search and recognize.

Each Protocol Type entry in the Protocol Filter Table 154 contains a specification of whether to filter (i.e., discard)

frames of this Type being received and/or transmitted on the associated port. Protocol Type filters are applied to all MAC unicast, multicast and broadcast (bridged and routed) frames, and the Protocol Type filters may be implemented separately on the receive and/or transmit paths of each port. The Protocol Type filter is applied with hardware acceleration at high speed without intervention by the Frame Processor (hardpath) for non-exception frames, and in the software for exception frames (softpath).

Figure 9:
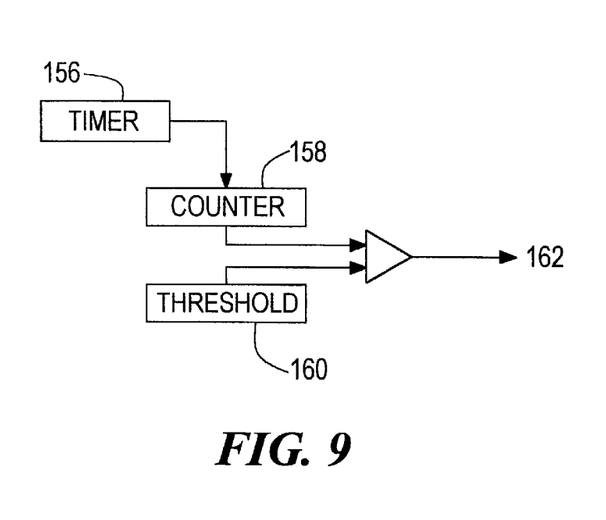
FIG. 9 illustrates non-unicast firewall filtering employed in the network interface module of FIG. 2.

Referring to FIG. 9, a non-unicast firewall filter may also be employed. The non-unicast firewall filter is provided only on the receive port. Software sets a hardware timer 156 including a counter 158 that counts multicast and broadcast frames coming into the port and increments the counter each time such a frame enters the port. The counter is compared to a threshold 160 to produce a result 162 which indicates whether the incoming frame is to be filtered. In particular, frames that enter the port once the threshold is exceeded are filtered. The counter is reset at the end of predefined intervals and another enable bit may be employed to indicate whether frames are to be exposed to the firewall filter. Hence, non-unicast traffic is held below a predefined level to improve bridge/router performance.

Having described the preferred embodiments, other embodiments that incorporate concepts of the presently disclosed invention will become apparent to those of skill in the art. Therefore, the invention should not be viewed as limited to the disclosed embodiments but rather should be viewed as limited only by the spirit in scope of the appended claims.

What is claimed is:

1. Apparatus for facilitating processing of a data unit in a bridge/router device, comprising:

at least one input port operative to receive the data unit;

a received frame circuit operative to determine whether a source address in the header of the data unit matches at least one address in a cache, and further operative to determine whether a destination address in the header of the data unit matches at least one address in the cache, and to provide a first indication in the event that the source address matches at least one address in the cache and the destination address matches at least one address in the cache, and to otherwise provide a second indication;

at least one filter logic circuit, operative to examine, responsive to the first indication, a header portion of the data unit to determine whether the data unit is in a first predetermined category and to filter the data unit if the data unit is determined to be in the first predetermined category, the at least one filter logic circuit including at least one filter logic circuit selected from the group consisting of a Protocol Type filter, a Port Group filter, a Media Access Control Address Group filter, a non-unicast traffic filter and a Combination filter; and a microprocessor, operative to execute, responsive to the second indication, software that determines whether the data unit is in a second predetermined category and that filters the data unit if the data unit is determined to be in a second predetermined category.

2. The apparatus of claim 1 wherein a plurality of said filter logic circuits are simultaneously operative to examine the data unit.

3. The apparatus of claim 1 including a separate, input port specific filter logic circuit enable indicator for each filter logic circuit, respective filter logic circuits being employed at the input port only if their respective enable indicator indicates that filtering is to be applied, whereby filter logic circuits are selectively employable at each input port.

4. The apparatus of claim 1 including at least one output port to transmit the data unit and a separate, output port specific filter logic circuit enable indicator for each filter logic circuit, respective filter logic circuits being employed at the output port only if their respective enable indicator indicates that filtering is to be applied, whereby filter logic circuits are selectively employable at each output port.

5. The apparatus of claim 3 wherein the at least one logic circuit operates at a speed that approaches the rate of data unit reception at said at least one input port.

6. A method for facilitating processing of a data unit in a bridge/router device having at least one input port, at least one output port, and processor circuitry, comprising the steps of:

receiving the data unit at one of the least one input port;

determining whether a source address in the header of the data unit matches at least one address in a cache;

determining whether a destination address in the header of the data unit matches at least one address in the cache;

providing a first indication in the event that the source address matches at least one address in the cache and the destination address matches at least one address in the cache, and otherwise providing a second indication;

examining, responsive to the first indication, a header portion of the data unit with at least one logic circuit to determine whether the data unit is in a first predetermined category and filtering the data unit with the logic circuit if the data unit is determined to be in the first predetermined category, wherein at least one of said at least one logic circuits performs filtering on the data unit based on a property selected from the group consisting of Protocol Type, Port Group number, Media Access Control Address Group, non-unicast traffic and combinations thereof; and executing, responsive to the second indication, software in the processor circuitry that determines whether the data unit is in a second predetermined category and that filters the data unit if the data unit is determined to be in the second predetermined category.

7. The method of claim 6 further including the step of simultaneously examining a data unit with a plurality of filter types.

8. The method of claim 6 wherein the bridge/router includes a separate, input port specific filter logic circuit enable indicator for each filter logic circuit, and further including the step of employing respective filter logic circuits at the input port only if their respective enable indicator indicates that filtering is to be applied, whereby filter logic circuits are selectively employable at each input port.

9. The method of claim 6 including at least one output port to transmit the data unit and a separate, output port specific filter logic circuit enable indicator for each filter logic circuit, and further including the step of employing respective filter logic circuits at the output port only if their respective enable indicator indicates that filtering is to be applied, whereby filter logic circuits are selectively employable at each output port.

10. The method of claim 9 further including the step of operating the at least one logic circuit at a speed that approaches the rate of data unit reception at the at least one input port.

11. The apparatus of claim 1, wherein the at least one source address is a media access control source address (MAC SA).

12. The apparatus of claim 1, wherein the at least one destination address is an IPv4 destination address.

13. The apparatus of claim 1, wherein the at least one filter logic circuit is further operative to detect an exception, and wherein the microprocessor is further operative to execute the software responsive to detection of the exception.

14. The apparatus of claim 1, wherein the first indication is a transmit vector.

15. The apparatus of claim 1, wherein the second indication is a receive vector.

16. The method of claim 6, wherein said at least one source address is a media access control source address (MAC SA).

17. The method of claim 6, wherein said at least one destination address is an IPv4 destination address.

18. The method of claim 6, further comprising:
    detecting an exception by the at least one logic circuit; and
    executing the software responsive to detection of the exception.

19. The method of claim 6, wherein the first indication is a transmit vector.

20. The method of claim 6, wherein the second indication is a receive vector.

* * * * *

UNITED STATES PATENT AND TRADEMARK OFFICE
CERTIFICATE OF CORRECTION

PATENT NO. : 6,041,058
DATED : March 21, 2000
INVENTOR(S) : John A. Flanders et al.

It is certified that error appears in the above-identified patent and that said Letters Patent is hereby corrected as shown below:

Title page,
Item [75], Inventors, "Stevan Van Seters" should read -- Stephen Van Seters --;

Column 3,
Line 54, delete "10"; and

Column 4,
Line 10, "72.30 but" should read -- 72, but --.

Signed and Sealed this

Seventh Day of October, 2003

JAMES E. ROGAN
*Director of the United States Patent and Trademark Office*